(No Model.)
J. HACKETT.
DOCK SCRAPER.
No. 463,353. Patented Nov. 17, 1891.
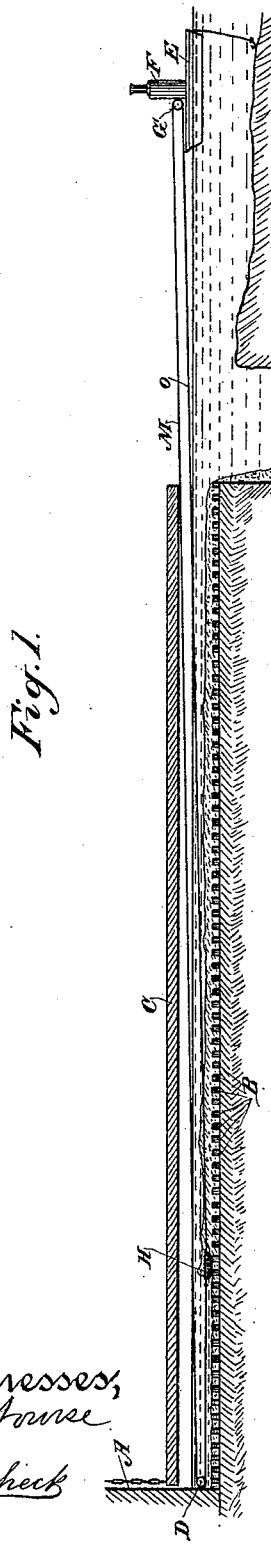
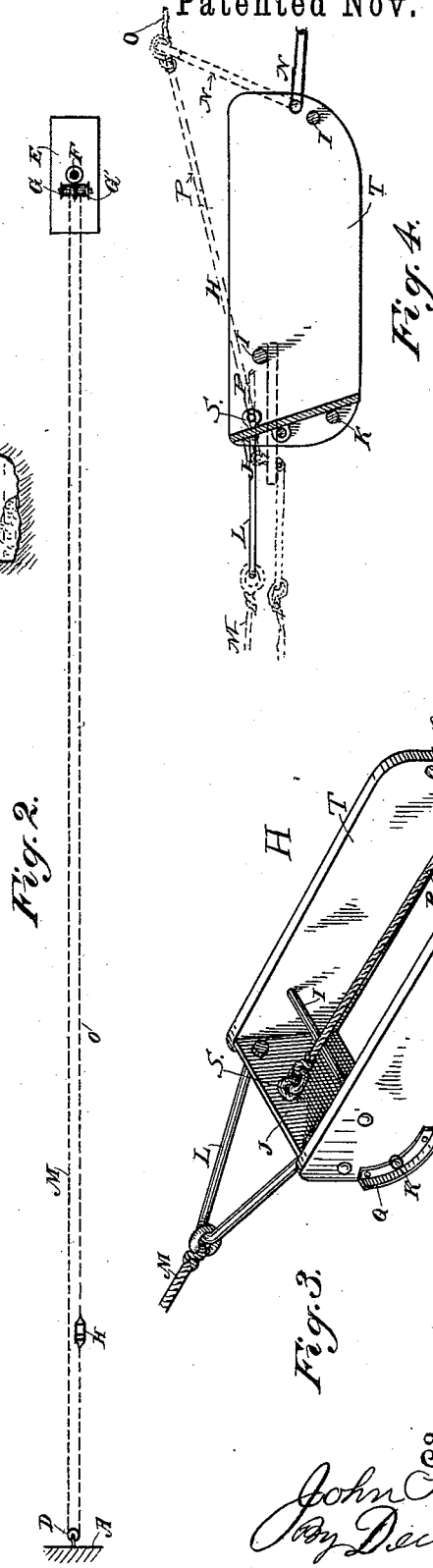
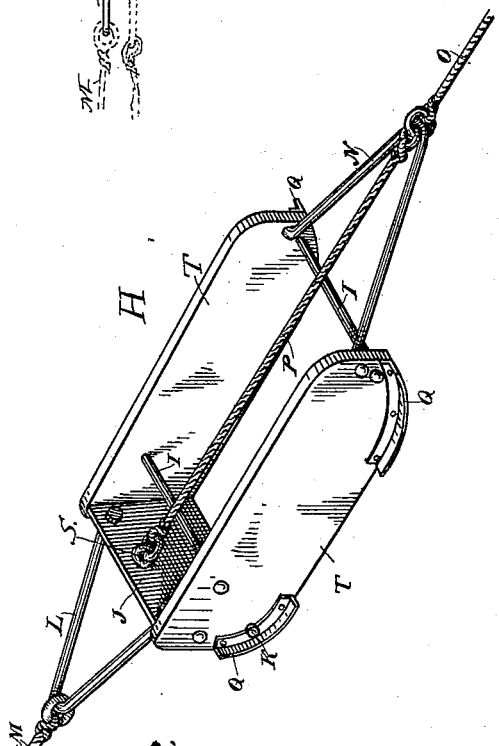
Witnesses,
Inventor,
John Hackett,
By Dewey & Co.
Attys

UNITED STATES PATENT OFFICE.

JOHN HACKETT, OF OAKLAND, CALIFORNIA.

DOCK-SCRAPER.

SPECIFICATION forming part of Letters Patent No. 463,353, dated November 17, 1891.

Application filed March 30, 1891. Serial No. 387,034. (No model.)

*To all whom it may concern:*

Be it known that I, JOHN HACKETT, a citizen of the United States, residing at Oakland, Alameda county, State of California, have invented an Improvement in Dock-Scrapers; and I hereby declare the following to be a full, clear, and exact description of the same.

My invention relates to a novel device which I call a "dock-scraper." It is especially useful for clearing out the mud which accumulates beneath hydraulic lift-docks and from other confined spaces of a similar nature.

It consists in certain details of construction, which will be more fully explained by reference to the accompanying drawings, in which—

Figure 1 is a general view of my device. Fig. 2 is a plan view of the same. Fig. 3 is a view of my scraper. Fig. 4 a is vertical section through the same.

In hydraulic docks the foundation is sufficiently low to admit of a platform, which is lowered so that the vessel can be floated into the dock above it and upon which the vessel is afterward raised out of water. This space above the bed or foundation timbers of the dock is liable to become filled with mud and other substances, so as to render it in time impossible to lower the platform as much as is necessary to admit large vessels. The contracted space, which is also a considerable distance below low-water mark, makes it almost impossible to clean this mud out and keep the dock free from it.

My invention is designed to provide a means for rapidly and effectually clearing out this mud when it has accumulated, as above described.

It consists of a scraper, with a means for reciprocating it beneath the platform of the dock, and a gate or door which is held open while the scraper is passing to the inner end, but which is closed, so that when the scraper is again drawn out it brings a load of mud with it.

A represents a sufficient portion of the rear wall of the dock to illustrate my invention.

B B are the sills or timbers which form the bottom.

C is the platform fitting between the walls of the dock and adapted to be raised or lowered by hydraulic pressure. This platform is lowered to the sills or timbers B to enable a vessel to be floated in above it at high tide, and after the vessel is suitably placed and supported the platform and vessel may be raised by the usual hydraulic presses, so that the vessel is entirely out of water.

To the inner or rear end or wall of the dock or to suitable piles or timbers fixed at some point adjacent thereto is attached a strong sheave D.

Outside the dock and opposite its mouth is anchored a scow or boat E, having upon it an engine F and winding-drums G G', which are driven by the engine.

In the present case I employ two winding-drums G G', standing closely together, and the rope passing from one of these drums G extends inwardly around the sheave at D, and thence returning is connected with the rear end of the scraper H. The rope which passes around the other drum G' extends directly to and is connected with the front end of the scraper H. It will be manifest that by winding a rope upon the first drum G and unwinding it from the second G' the scraper will be drawn to a point as near the sheave D as may be desired, and then by winding the rope upon the second drum G' and allowing it to unwind from the first one G the scraper is again withdrawn.

The scraper H may be made in various forms. In the present case I have shown it constructed with two sides T, which are preferably made of steel to insure sufficient strength, and they are connected together by cross-bars I, which hold them with sufficient rigidity in their relative parallel positions.

J is a swinging gate pivoted between the sides at or near the rear end, so that its lower edge extends to near the bottom of the scraper, and when in an approximately vertical position, in which it stands when it has a load to move, it is held by a transverse bar K or other stop extending between the sides and behind this gate. The gate is allowed to swing upward about its pivots or hinges into an approximately horizontal position, being stopped by one of the transverse bars I, against which it strikes. A crotch, bail, or yoke L is connected with the upper edge of this door, as shown, and to this the rope M is connected, extending thence around the pulley D and back to the first-named winding-drum G upon the scow or boat.

To the front end of the scraper is connected a similar bail or yoke N, and to this is attached the hauling-rope O, which extends directly to and winds upon the drum G'. From this yoke N a short connecting-rope P extends back and is attached to a ring S on the inner side of the gate J above its pivot or fulcrum points.

In order to insure the scraper traveling freely over the transverse floor, timbers, or sills of the dock, the lower edges of the sides H are rounded or beveled at each end so as to present no obstacle to its free movement in or out when it is traveling upon and in contact with the sills. In order to prevent these sides from cutting the sills and also to assist in some degree in depressing them through the mud if the latter be stiff, I have shown the flanges or plates Q projecting slightly on each side at the front and back and secured to the sides H in any suitable or desirable manner. The rear flanges Q act somewhat like plows or like inclined scrapers, which have a tendency to enter the ground or mud when the device is drawn forward. This keeps the rear end where the gate is situated from rising. The flanges at the forward end are more nearly horizontal and ride upon the mud, especially when the scraper is being drawn back to the rear of the dock.

The operation of this device is as follows: The scraper being at the entrance to the dock, the drums G and G' are set in motion, but only one of them is thrown in gear with the driving mechanism, and the rope M, passing around the sheave D at the inner end of the dock and thence passing out, is wound upon the drum G, and pulling upon the top of the door J the latter is pulled into an inclined or horizontal position, which allows it to slide smoothly over the top of the mud until the scraper has been drawn back as far as desired. The drum G is then thrown out of gear and the drum G' reversed, pulling upon the rope O, which connects directly with the front of the scraper, and as this rope tightens it acts, through the short connecting-rope P, to pull the top of the door forward, thus insuring its lower edge being turned down, so that the door will stand in a nearly-vertical position and will be prevented from pulling open by reason of any pull upon the rear rope. In this position it gathers a load of mud, which, together with a considerable amount in front of the scraper, will be drawn and forced out from the front end of the dock. The operation is again reversed and the scraper drawn back to the rear of the dock, and the pulley D is also gradually shifted by hand, so as to cause the scraper to traverse from one side to the other, if found necessary, until the whole space beneath the dock has been sufficiently cleared of mud. Where the mud is a very soft ooze, the scraper may be moved back and forth in an approximately central line between the side walls of the dock, and as fast as the mud is removed in this channel it will flow in from the sides, so that the greater part, or as much as may be necessary, may be entirely removed without shifting the sheave D from its original position.

I have found the device exceedingly valuable for cleaning out the space beneath a dock four hundred and sixty feet long by sixty-six feet in width, where the work has been carried on, and the dock entirely cleared of mud without in any way interfering with its operation and without interruption of the cleaning operation, except at times when vessels were being taken on or let off from the dock.

Having thus described my invention, what I claim as new, and desire to secure by Letters Patent, is—

1. A scraper for docks and other confined spaces, consisting of vertical side walls having a door or gate hinged or pivoted between them and capable of swinging from an approximately horizontal to an approximately vertical position about its journals and stops to limit its motion in either direction, a rope connected with the upper edge of said door, passing around a sheave at the inner end of the space to be cleansed, thence outwardly to a winding-drum, whereby the scraper is hauled inwardly, and the door is automatically held open and in a position to offer least resistance while the scraper is being thus moved, substantially as herein described.

2. A scraper consisting of the vertical side walls connected together, a door or gate journaled or pivoted between these sides with stops whereby said gate is allowed a limited motion between a horizontal and vertical position, a rope connected with the upper edge of the door, passing around a sheave at the inner end of the space to be cleaned and thence to a winding-drum, whereby the door is opened and the scraper is hauled into the space, a second rope connected with the front of the scraper and a second winding-drum whereby the scraper may be hauled out, and a supplemental rope connecting said hauling-rope with the top of the door, whereby the door is drawn into position to retain and carry its load whenever the scraper is hauled outwardly, substantially as herein described.

3. A scraper consisting of the vertical sides connected together, having a swinging gate fulcrumed between the sides, stops between which the gate is capable of a limited motion between the horizontal and vertical positions, a rope by which the gate is opened and the scraper hauled to the rear of the space to be cleaned, a second rope by which the gate is closed and the scraper hauled out when it is loaded, and curved shoes fitted to the bottom of the scraper, on which the latter travels over the timbers of the dock, substantially as herein described.

In witness whereof I have hereunto set my hand.

JOHN HACKETT.

Witnesses:
S. H. NOURSE,
J. A. BAYLESS.